United States Patent
Inoue et al.

(10) Patent No.: US 8,334,076 B2
(45) Date of Patent: Dec. 18, 2012

(54) LITHIUM ION SECONDARY BATTERY AND METHOD FOR PRODUCING NEGATIVE ELECTRODE THEREFOR

(75) Inventors: Kaoru Inoue, Osaka (JP); Yusuke Fukumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1607 days.

(21) Appl. No.: 11/791,366

(22) PCT Filed: Sep. 28, 2005

(86) PCT No.: PCT/JP2005/017892
§ 371 (c)(1),
(2), (4) Date: May 23, 2007

(87) PCT Pub. No.: WO2006/061940
PCT Pub. Date: Jun. 15, 2006

(65) Prior Publication Data
US 2007/0292765 A1 Dec. 20, 2007

(30) Foreign Application Priority Data
Dec. 10, 2004 (JP) .................................. 2004-357851

(51) Int. Cl.
*H01M 2/16* (2006.01)
*H01M 4/82* (2006.01)
(52) U.S. Cl. .................. 429/246; 429/247; 29/623.5
(58) Field of Classification Search .................. 429/322, 429/231.95, 232, 217, 129, 246–247; 29/623.1, 29/623.3–623.5
See application file for complete search history.

(56) References Cited

U.S. PATENT DOCUMENTS

| 6,881,438 B2 * | 4/2005 | Daido et al. .................. 427/115 |
| 2004/0013946 A1 | 1/2004 | Abe et al. |

FOREIGN PATENT DOCUMENTS

| JP | 07-173323 | 7/1995 |
| JP | 07-220759 | 8/1995 |
| JP | 2000-149906 | 5/2000 |
| JP | 2001-023613 | 1/2001 |
| JP | 2002-270161 | 9/2002 |
| JP | 2003-142078 | 5/2003 |
| JP | 2003142078 A * | 5/2003 |

OTHER PUBLICATIONS

Machine Translation and Abstract in English of JP 2003-142078.*

* cited by examiner

*Primary Examiner* — Barbara Gilliam
*Assistant Examiner* — Claire L Roe
(74) *Attorney, Agent, or Firm* — McDermott Will & Emery LLP

(57) ABSTRACT

The present invention relates to an improvement in a lithium ion secondary battery including a positive electrode, a negative electrode, a separator, a non-aqueous electrolyte, and a porous film formed on at least one electrode surface. The porous film includes inorganic compound particles and polyvinylidene fluoride. The viscosity of the N-methyl-2-pyrrolidone solution dissolving 8 wt % polyvinylidene fluoride is 600 to 2400 mPa·s at 25° C., and the amount of the polyvinylidene fluoride in the porous film is 1 to 10 parts by weight per 100 parts by weight of the inorganic compound particles.

6 Claims, 2 Drawing Sheets

LITHIUM ION SECONDARY BATTERY AND METHOD FOR PRODUCING NEGATIVE ELECTRODE THEREFOR

This application is the U.S. National Phase under 35 U.S.C. §371 of International Application No. PCT/JP2005/017892, filed on Sep. 28, 2005, which in turn claims the benefit of Japanese Application No. 2004-357851, filed on Dec. 10, 2004 the disclosures of which Applications are incorporated by reference herein.

TECHNICAL FIELD

The present invention relates to an excellently safe lithium ion secondary battery in terms of resistance to a short circuit and heat. To be more specific, the present invention relates to a lithium ion secondary battery including an electrode having a porous film with excellent adhesiveness on the surface thereof, and to a method for producing a negative electrode therefor.

BACKGROUND ART

Due to its high capacity and high discharging voltage, application of lithium ion secondary batteries has been expanding as a power source for various portable devices. The battery includes a separator, which is disposed between the positive electrode and the negative electrode to electrically insulate the electrodes from each other. For the separator, microporous films comprising a polyolefin resin are mainly used.

However, the separator comprising a polyolefin resin has heat-resistance to temperature of about 120 to 160° C., and its heat-resistance is insufficient. Thus, there is a problem in that the battery temperature becomes abnormally high, when an internal short-circuit occurred in the battery or a sharply projected object such as a nail is penetrated into the battery. That is, when an internal short-circuit occurs, the separator contracts from the short circuit reaction heat to expand the short circuit portion, generating much further reaction heat.

Therefore, to solve the above problem, a method is proposed to form a porous film comprising a resin binder and a powder of an inorganic compound such as alumina, on at least one surface of the positive electrode and the negative electrode (for example, Patent Document 1). Also proposed is a method for improving the mechanical strength of a resin binder for the porous film, i.e., polyvinylidene fluoride (for example, Patent Document 2).

However, since the porous film is hard, when an electrode assembly is produced by winding the electrode having the porous film, there has been a problem in that the porous film comes off and separates from the electrode along with the material mixture layer of the electrode. Furthermore, even by simply applying the technique disclosed in Patent Document 2, the problem mentioned above is not solved.
Patent Document 1:
Japanese Laid-Open Patent Publication No. Hei 07-220759
Patent Document 2:
Japanese Laid-Open Patent Publication No. Hei 07-173323

DISCLOSURE OF THE INVENTION

Problem that the Invention is to Solve

The present invention is to solve the problem mentioned above, and aims to provide a lithium ion secondary battery with higher safety and excellent discharge performance by improving adhesiveness of the porous film to decrease separation of the porous film and the material mixture layer in the step of manufacturing the electrode assembly by winding the electrodes.

Means For Solving The Problem

The present invention provides a lithium ion secondary battery comprising:
a positive electrode including a lithium composite oxide;
a negative electrode including a material capable of electrochemically absorbing and desorbing lithium;
a separator;
a non-aqueous electrolyte; and
a porous film formed on at least one electrode surface of the positive electrode and the negative electrode:
(a) the porous film including inorganic compound particles and a resin binder;
(b) the resin binder in the porous film being polyvinylidene fluoride;
(c) a viscosity of an N-methyl-2-pyrrolidone solution dissolving polyvinylidene fluoride in 8 wt % being 600 to 2400 mPa·s at 25° C.; and
(d) an amount of the polyvinylidene fluoride in the porous film being 1 to 10 parts by weight per 100 parts by weight of the inorganic compound particles.

The porous film is preferably formed on the negative electrode surface, and the negative electrode preferably includes styrene-butadiene copolymer or a modified material thereof as the binder.

The present invention also provides a method for producing a negative electrode for a lithium ion secondary battery, the negative electrode comprising a porous film on the surface thereof
the method comprising the steps of:
(a) preparing a paste including at least a negative electrode active material, a binder, a solvent or a dispersion medium for the binder, and carboxymethyl cellulose as a thickener;
(b) applying the paste on a metal foil current collector, drying, rolling, and then heat-treating at a temperature of 140 to 250° C.; and
(c) forming a porous film including inorganic compound particles and polyvinylidene fluoride on the negative electrode after the previous step.

Effect of the Invention

Based on the present invention, by the effects of the porous film, safety is improved with regard to an internal short-circuit in lithium ion secondary batteries, and by increasing adhesiveness of the porous film, separation of the electrode material mixture can be reduced as well, achieving high productivity.

BEST MODE FOR CARRYING OUT THE INVENTION

Figure 1:
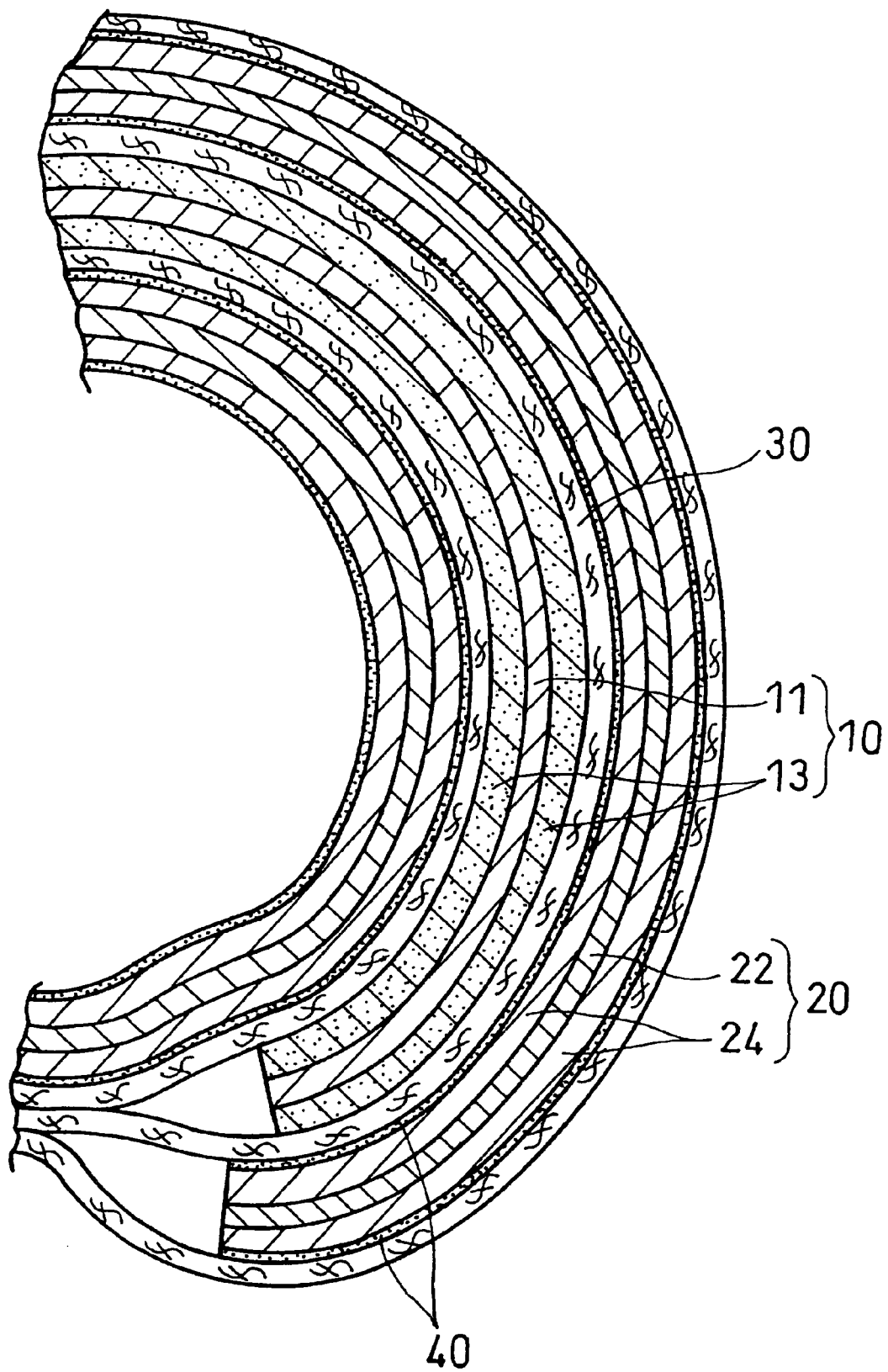
FIG. 1 is a transverse cross section of a relevant part of an electrode assembly of a lithium ion secondary battery in Example of the present invention.

The present invention relates to a lithium ion secondary battery comprising a positive electrode including a lithium composite oxide, a negative electrode including a material capable of electrochemically absorbing and desorbing lithium, a separator, a non-aqueous electrolyte, and a porous film formed on at least one electrode surface of the positive electrode and the negative electrode, and especially relates to an improvement in the porous film.

In the porous film of the present invention, inorganic compound particles and a resin binder are the necessary elements. With this porous film, discharge performance can be easily maintained, since the gaps between the inorganic compound particles can be easily secured for lithium ion pathway, compared with a porous film composed only of resin.

In the porous film of the present invention, the resin binder is polyvinylidene fluoride; the viscosity of an 8 wt % N-methyl-2-pyrrolidone solution is 600 to 2400 mPa·s at 25° C.; and the amount of the polyvinylidene fluoride in the porous film is 1 to 10 parts by weight per 100 parts by weight of the inorganic compound particles.

The viscosity of a solution of polyvinylidene fluoride in an organic solvent is a standard by which the molecular weight of polyvinylidene fluoride is shown, and generally, a larger molecular weight means a higher viscosity, and flexibility as resin decreases.

Inventors of the present invention examined in detail the phenomenon of the separation of the porous film formed on the electrode surface from the electrode surface when the positive electrode, the negative electrode, and the separator for separating the electrodes from each other are wound to form a wound electrode assembly: as a result, they found out that when the above-mentioned viscosity of polyvinylidene fluoride (hereinafter noted as PVDF), i.e., the binder of the porous film, is high, that is, when the molecular weight is large and the flexibility is insufficient, the separation from the electrode surface does not occur easily, compared with those with low viscosity.

Conventionally, PVDF has been examined also as the binder for the electrode material mixture of lithium ion secondary batteries. Specifically, it has been examined as the binder in the case where the material mixture layer is formed by applying and drying a material mixture paste including a positive electrode active material, a conductive agent, and a binder on the surface of a current collector comprising metal foil. In a lithium ion secondary battery, for example, in a general cylindrical battery with a diameter of 15 to 30 mm, the winding-start portion is wound around a winding core with a diameter of 3 to 5 mm. At that time, lack of flexibility causes chipping and cracking of the material mixture layer, especially at the winding-start portion and also at the outer side of the electrode, leading to the material mixture separation. For such PVDF as the binder of the material mixture layer, those having a large molecular weight and less flexibility have been considered inappropriate.

However, since the porous film to be formed on the electrode surface is very thin compared with the material mixture layer, it was found that a large molecular weight, less flexibility, and therefore cracks caused upon winding the electrode are advantageous. The porous film includes inorganic compound particles such as alumina as the filler, and PVDF as the binder functions to bind the particles together and to bond the particles to the electrode surface. When the electrode is wound, tension is applied to the porous film covering the material mixture layer at the outer side of the electrode in the direction parallel to the winding direction, causing numerous irregular, minute cracks on the porous film surface. At this time, the reverse side of the film is attached to the electrode, and although a portion of the particles detached from the binder due to the cracks may undergo separation, the majority is attached to the binder partially. Therefore, the whole of a certain size of a region of the binder including particles will not separate from the electrode surface. Additionally, although compression force is applied to the porous film covering the material mixture layer at the inner side of the electrode upon winding, since it is absorbed by the numerous minute cracks portion, removal and separation of the porous film can be curbed.

On the other hand, when PVDF with excellent flexibility is used and tension is applied to the porous film covering the material mixture layer at the outer side of the electrode in the direction parallel to the winding direction upon winding the electrode, the elongation occurs while the particles forming the porous film and PVDF are bound together, to loosen the bond between the film and the electrode, causing a certain degree of regional separation from the electrode and large cracks to increase the exposed portion of the material mixture layer. Additionally, when the compression force is applied upon winding, the bond between the film and the electrode is loosened, and the porous film covering the material mixture layer at the internal side of the electrode separates from the electrode.

In view of the above phenomenon, in the present invention, by using PVDF lacking flexibility as the binder, which is seemingly disadvantageous, a porous film with excellent adhesiveness and which can endure the winding of the electrode is formed on the electrode.

In the present invention, as mentioned above, by the occurrence of the minute cracks to the porous film, the porous film separation and large cracks upon winding are curbed. Therefore, the thickness of the porous film is preferably 0.5 to 20 µm. When it is too thick, the portion of the separation due to the cracks upon winding becomes large. Also, when it is too thin, functions of the porous film cannot be achieved. The thickness of the material mixture layer of the electrode to which this porous film is applied is preferably in the range of 40 to 150 µm per one side of the electrode.

In the present invention, the viscosity of the solution as the scale of the PVDF molecular weight is determined by the viscosity of the N-methyl-2-pyrrolidone (hereinafter referred to as NMP) solution (concentration of 8±0.2 wt %) at 25° C. The viscosity is preferably measured by a rotational B-type viscometer.

The PVDF having a low viscosity in the solution renders the viscosity of the slurry for forming the porous film low. Therefore, the application process for forming a uniform film involves difficulty. The adhesiveness of the film obtained is thus low. On the other hand, the PVDF having a high viscosity in the solution renders the adhesiveness as the binder high, but the slurry preparation becomes difficult.

As a result of examining the viscosity of the solution and the properties of the porous film obtained, the inventors of the present invention found out that 600 mPa·s or more is preferable for obtaining a porous film with adhesiveness that can endure the winding of the electrode. However, since the PVDF having an extremely high molecular weight and exceeding 2400 mPa·s hardly dissolves in an organic solvent such as NMP, a complete dissolution necessitates usage of a large amount of solvent, and it is difficult to adjust the viscosity of the slurry to an appropriate value. Therefore, such a PVDF with an extremely high molecular weight is not preferable.

Although the viscosity as the scale for selecting PVDF is obtained with a solution of PVDF in NMP, and although NMP is the most preferable one for the solvent used for preparing a slurry for forming the porous film, it is not limited thereto. For example, a polar solvent such as methyl ethyl ketone and cyclohexane may be used.

The ratio of PVDF to be added for forming the porous film is preferably 1 to 10 parts by weight per 100 parts by weight of the inorganic compound particles. In the porous film including the inorganic compound particles, when a stress is applied upon winding the electrode, the adhesiveness of the porous film is greatly affected by the mobility of the particles, that is, flowability of the powder. For absorbing the flowability of the powder by minute cracks of the film, with an excessive PVDF ratio, large cracks occur and as a result, the separation amount becomes large. The inventors of the present invention found out such a fact, and set the upper limit of the amount of PVDF to be added to 10 parts by weight per 100 parts by weight of the inorganic compound particles. Also, with an extremely small amount of PVDF to be added, the adhesiveness of the porous film itself significantly declines. Therefore, the lower limit of PVDF to be added is set to 1 part by weight per 100 parts by weight of the inorganic compound particles.

The inorganic compound particles used here are required to be an electrical insulator, and have heat-resistance. The reason is that even when some external factors caused an internal short-circuit to generate heat in the battery, the heat-resistance of the inorganic compound particles can prevent the battery overheat from the expansion of the short circuit portion. The inorganic compound particles are also required to have electrochemical stability in the potential window of the lithium ion secondary battery, in addition to the heat-resistance. For the inorganic compound satisfying such conditions, material such as alumina, silica, zirconia, and titania may be mentioned.

A paste for the porous film is prepared with the above mentioned inorganic compound particles, PVDF, and a polar organic solvent for dissolving the PVDF. The porous film is formed by applying this paste for the porous film on at least one electrode of the positive electrode and the negative electrode, and drying. The electrode on which this porous film is formed may be any of the positive electrode and the negative electrode, but considering the unique conditions in forming the lithium ion secondary battery, i.e., the negative electrode width is made larger than that of the positive electrode, it is preferable to provide it on the negative electrode, in view of improving resistance to short circuit.

When the porous film of the present invention is to be formed on the negative electrode, a precursor paste for the porous film is prepared with a polar solvent represented by NMP. When a material that is soluble to this polar solvent or that is vulnerable to swelling is included in the negative electrode material mixture layer forming the porous film, pores in the negative electrode material mixture layer that are responsible for ion conductivity are clogged to decline discharge performance. Therefore, for the binder included in the negative electrode material mixture layer, i.e., the base of the porous film, preferably selected is styrenebutadiene rubber (SBR) or a modified material thereof, which is not soluble to polar solvents, does not easily swell, and can bring out binding effects with a small amount.

For the modified SBR, particularly preferable one is a core-shell type modified material, represented by BM-400B (product name) manufactured by Zeon Corporation. This material is a functional material, in which a hard component for retaining its form is disposed at the core portion, and a soft, highly adhesive component for bringing out adhesiveness is disposed at the shell portion. By using such a material, with half the amount of the ordinary SBR, binding ability that is equivalent to the case using ordinary SBR can be given to the negative electrode material mixture layer.

In a preferable embodiment of the present invention, the negative electrode is made as in the following. First, a paste for a negative electrode material mixture is made by adding a sodium salt of carboxymethyl cellulose (hereinafter referred to as CMC) as a thickener to a material of the negative electrode material mixture, at least to a negative electrode active material and a binder. This paste for the negative electrode material mixture is applied to a current collector of metal foil, dried and rolled. Then, heat treatment is carried out at 140 to 250° C. Afterwards, a porous film is formed on the negative electrode surface.

By thus making the negative electrode, productivity of the negative electrode and battery discharge performance can both be achieved. To be specific, by adding CMC, stability of the paste increases and productivity (negative electrode yield) improves, while by burning down CMC having significant film-forming effects with the heat-treatment, excessive coverage on the negative electrode active material by CMC can be avoided to keep discharge performance. For the heat-treatment temperature, below 140° C. causes insufficient CMC carbonization and volatilization, and over 250° C. causes decline in adhesiveness due to the change in the negative electrode binder quality. Therefore, the above-mentioned heat-treatment is preferably carried out at 140 to 250° C.

The thickness of the porous film to be formed on the electrode surface is not particularly limited, but in view of bringing out sufficiently the function of safety improvement and securing battery capacity, it is preferably 0.5 to 20 μm. The total sum of the separator thickness and the porous film thickness is preferably 15 to 30 μm.

Appropriate elements forming a lithium ion secondary battery of the present invention are noted below.

The positive electrode includes at least a positive electrode active material, a binder, and a conductive agent.

For the positive electrode active material, a lithium composite oxide may be mentioned. For the lithium composite oxide, lithium cobaltate and a modified material thereof, lithium nickelate and a modified material thereof, and lithium manganate and a modified material thereof are preferable. Each modified material may include other elements such as aluminum and magnesium. At least two of cobalt, nickel, and manganese may be included as well, for example, as in $LiNi_{1/3}Co_{1/3}Mn_{1/2}O_2$ and $LiNi_{0.8}Co_{0.2}O_2$.

The binder used for the positive electrode is not particularly limited, and polytetrafluoroethylene (hereinafter referred to as PTFE), modified acrylonitrile rubber particles represented by BM-500B (product name) manufactured by Zeon Corporation, and PVDF may be used. PTFE and BM-500B are preferably used in combination with CMC, polyethylene oxide, and PVDF, which are the thickener for the paste for forming the positive electrode material mixture layer. PVDF alone functions as both binder and thickener.

For the conductive agent, acetylene black, ketjen black, and various graphites may be used. These may be used singly, or may be used in combination of two or more.

The negative electrode includes at least a negative electrode active material and a binder. For the negative electrode active material, various natural graphites, various artificial graphites, a silicon containing composite material such as silicide, and various alloy materials may be used. For the binder, the most preferable one is, as mentioned above, SBR or SBR modified with polyacrylic acid, but other than those, PVDF and polyethylene microparticles may be used.

An electrode assembly is formed by winding the above positive and negative electrodes with the separator interposed therebetween. For the separator, a microporous film of polyethylene or polypropylene is used.

A lithium ion secondary battery of the present invention is formed by inserting the electrode assembly including the positive electrode, the negative electrode, and the separator into a bottomed, metal-made battery case; injecting a non-aqueous electrolyte; and sealing an opening of the battery case.

The non-aqueous electrolyte is composed of a non-aqueous solvent and a solute. For the solute, various lithium salts such as $LiPF_6$ and $LiBF_4$ may be used. For the non-aqueous solvent, ethylene carbonate, propylene carbonate, dimethyl carbonate, diethyl carbonate, and ethyl methyl carbonate are used preferably, but not limited thereto. The non-aqueous solvent may be used singly, or may be used in combination of two or more. For the additive, vinylene carbonate, cyclohexyl benzene, and modified materials thereof may be used.

Figure 2:
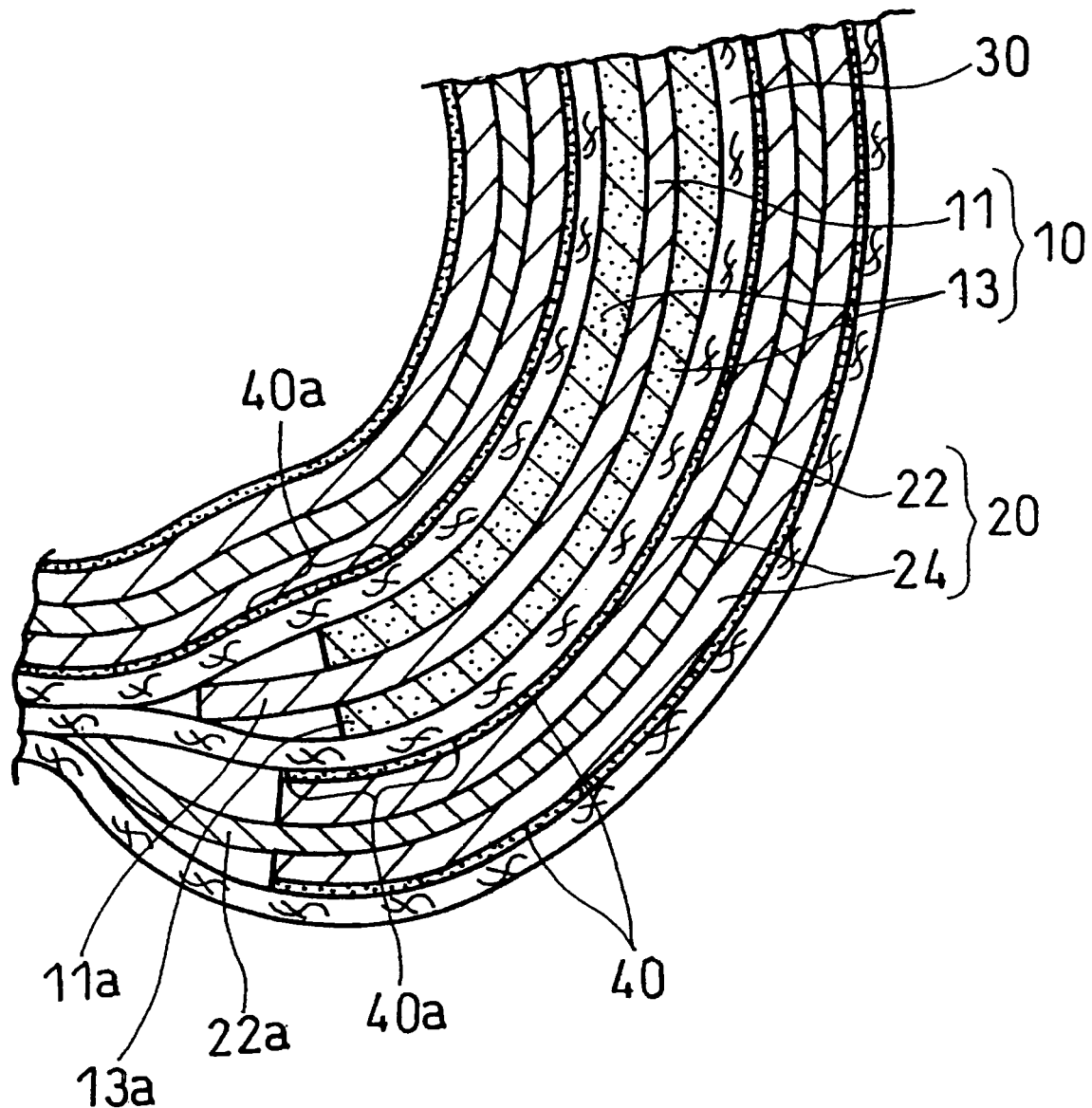
FIG. 2 is a transverse cross section of a relevant part of an electrode assembly in another Example.

An example of an electrode assembly of a lithium ion secondary battery of the present invention is shown in FIG. 1 and FIG. 2. FIG. 1 is a transverse cross section of an electrode assembly wound around, at a portion where the winding starts. Reference numeral 10 represents a positive electrode comprising a positive electrode current collector 11 and positive electrode material mixture layers 13 carried on both sides thereof. A negative electrode 20 comprises a negative electrode current collector 22 and negative electrode material mixture layers 24 carried on both sides thereof, and on the surfaces of respective material mixture layers, porous films 40 are formed. The positive electrode 10 and the negative electrode 20 mentioned above are spirally wound around with the separator 30 interposed therebetween.

FIG. 2 shows an example where respective end portions 11a and 22a of the current collectors 11 and 22 are exposed at the side where the winding of the positive electrode 10 and the negative electrode 20 starts. To these exposed portions 11a and 22a of the current collectors, although not shown, a positive electrode lead and a negative electrode lead are welded, respectively. When the exposed portion of the current collector is present at the end portion of the electrode, as in the above case, the proximity of the end portion of the material mixture layer facing the exposed portion is vulnerable to a short circuit occurrence. Therefore, the porous film is formed preferably on such a portion vulnerable to a short circuit occurrence. In the example of FIG. 2, a portion 40a of the porous film 40 at the surface of the negative electrode 20 facing the end portion 13a of the positive electrode material mixture layer 13 with the separator 30 interposed therebetween contributes to the short circuit prevention in such a case mentioned above. The portion 40a of the porous film may further be extended to the surface of the current collector 22a, as the case may be. FIG. shows an example where the porous film is present all over the negative electrode material mixture surface, but the porous film may be formed only at the portion 40a facing the end portion 13a of the positive electrode material mixture. Also, in the FIG., although the porous film is made only at the negative electrode side, the film may be formed at the positive electrode side instead.

Examples of the present invention are described in the following.

Example 1

A negative electrode paste was made by stirring 2 kg of artificial graphite, 75 g of an aqueous dispersion of modified SBR (BM-400B manufactured by Zeon Corporation, a solid content of 40 wt %), 30 g of CMC, and an appropriate amount of water with a double-armed kneader. This paste was applied on both sides of copper foil with a thickness of 10 μm, dried, and rolled to give a total thickness of 180 μm. Negative electrode reels were thus obtained. The obtained negative electrode reels were dried in air at 110° C. for 6 hours.

Then, porous films were formed on the negative electrode reels by the method in below.

For porous film materials, an alumina powder with an average particle size of 0.5 μm, and four kinds of solutions of PVDF in NMP (#1120, #1320, #1710, and #7208 manufactured by Kureha Corporation) as resin binders were used. A concentration of 8.0 wt % was given to these solutions by appropriately diluting with NMP, and the viscosity was determined at 25° C. For the viscosity determination, a B-type viscometer was used and the measurement was carried out with a rotor No. 6 at 20 rpm. Four types of pastes 1A, 1B, 1C, and 1D for the porous film were made by stirring predetermined amounts of the four types of the PVDF solutions, respectively, along with 950 g of the alumina powder, and an appropriate amount of NMP with a double-armed kneader: the viscosity was adjusted to 50 to 100 mPa·s. The predetermined amounts of the PVDF solutions were set so that the amount of PVDF was 7 parts by weight in 1A, 6 parts by weight in 1B, 4 parts by weight in 1C, and 1.5 parts by weight in 1D per 100 parts by weight of the alumina powder. The predetermined amounts of the PVDF solutions were the amounts obtained in advance by preriminary examination for giving a porous film with an adhesive strength of 7 $N/m^2$.

Then, on both sides of the above negative electrode reels, the paste 1A, 1B, 1C, or 1D for the porous film was applied respectively and dried to give a thickness of 5 μm, thereby obtaining four types of negative electrode reels 1A, 1B, 1C, and 1D.

Further, test materials 1A, 1B, 1C, and 1D for the adhesive strength of the porous film layer were obtained by applying the above pastes for the porous film on one side of copper foil with a thickness of 20 μm and then drying the paste at 80° C., thereby giving a thickness of 20 μm.

For each of the four types of the pastes for the porous film, the negative electrodes with the porous film, and the adhesive strength test materials thus obtained as in the above, the following tests were carried out: the dispersiveness test of the paste for porous film, the peeling test of the negative electrode with the porous film, and the adhesive strength test of the porous film, as shown below. The results are shown in Table 1, along with the viscosity at 25° C. of the used NMP solutions dissolving 8 wt % PVDF.

(i) Dispersiveness Test of Paste for Porous Film

Dispersiveness test of the paste for the porous film was carried out by using a grind gage manufactured by BYK-Gardner. The paste for the porous film was placed on the grind gage, and the paste was applied on the grind gage while being spread: the scale of the grind gage was read at the point where the paste stuck and the application became unable.

(ii) Peeling Test of Negative Electrode with Porous Film

A test material obtained by cutting the negative electrode reel with the porous film to give a size, i.e., a width of 62 mm and a length of 570 mm, was wound with a separator. For the separator, a polyethylene microporous film with a thickness of 16 μm was used. The test material and the separator stacked thereon were wound around a winding core with a diameter of 3.5 mm, while a tensile stress of 400 gf was being applied thereto. Ten wound test materials with the separators were thus produced. Then, these wound test materials with the separators were loosened and rolled out, and the weights of the negative electrode material mixture layers and the porous films separated and removed from the test materials were measured.

(iii) Adhesive Strength Test of Porous Film

The adhesive strength test was carried out by using RTC-1150A, a universal tester manufactured by Orientec Co., Ltd. Each of the adhesive strength test materials of the porous film made in Example 1 was cut to give a rectangular shape with a width of 50 mm and a length of 100 mm, and the porous film was removed at a portion of one short side thereof to expose the copper foil to a width of 10 mm. This was regarded as a test piece. The porous film side face of the test piece was fixed on the base board with the double-faced tape. The exposed copper foil portion of the test piece fixed on the base board was fixed to a fixing tool at the tip of the pull-up board. Then, the pull-up board was pulled in a direction vertical to the base board, and the strength for the porous film and copper foil separation was determined.

TABLE 1

| Electrode Plate | Viscosity of PVDF Solution (mPa·s) | Amount of PVDF Added* (parts by weight) | Results of Dispersiveness Test On Paste for Porous film (μm) | Adhesive Strength of Porous Film (N/m$^2$) | Results of Peeling Test (mg) |
|---|---|---|---|---|---|
| 1A | 270 | 7.0 | 5 or less | 7 | 2.5 |
| 1B | 610 | 6.0 | 5 or less | 7 | 0 |
| 1C | 1400 | 4.0 | 5 or less | 7 | 0 |
| 1D | 2350 | 1.5 | 5 or less | 7 | 0 |

*the amount shown is per 100 parts by weight of alumina

Table 1 shows that by using these materials, a suitable paste for the porous film with no coagulation can be made: no paste stuck and the application was excellent with any of the PVDFs.

Regarding the adhesive strength of the porous film relative to the copper foil, it shows that as the weight average molecular weight of the PVDF increases, the proportion of the necessary amount thereof to be added for keeping the same adhesive strength becomes less. This shows that the larger the molecular weight of PVDF, the better the binding ability.

The results of the peeling test of the negative electrode having the porous film show that by using PVDF which gives a viscosity of 600 mPa·s or more at 25° C. to an NMP solution dissolving 8 wt % PVDF, peeling can be curbed for the most part. This shows that the larger the PVDF molecular weight, the better the adhesiveness.

The above results show that by using PVDF which gives a viscosity of 600 to 2400 mPa·s at 25° C. to an NMP solution dissolving 8 wt % PVDF, a negative electrode with a porous film which has excellent paste conditions and higher binding ability, and which does not peel off can be obtained.

Example 2

A paste for a positive electrode material mixture was made by mixing 3 kg of lithium cobaltate, 1 kg of a solution of PVDF in NMP (#1320 manufactured by Kureha Corporation), 90 g of acetylene black, and an appropriate amount of NMP with a double-armed kneader. This paste was applied on both sides of aluminum foil with a thickness of 15 μm, dried, and rolled to give a total thickness of 160 μm. Positive electrode reels were thus obtained.

Then, porous films were formed on the obtained positive electrode reels by the following method.

That is, pastes 1A, 1B, 1C, and 1D for the porous film obtained in the same manner as Example 1 were applied on both sides of the positive electrode reels to give a thickness of 5 μm, and dried. Positive electrode reels 2A, 2B, 2C, and 2D with four types of porous films were thus obtained.

Further, the above pastes for the porous film were applied on one side of aluminum foil with a thickness of 15 μm and dried at 80° C. to give a thickness of 20 μm. Porous film adhesive strength test materials 2A, 2B, 2C, and 2D were thus obtained.

For the obtained positive electrodes with four types of the porous films and the porous film adhesive strength test materials, the peeling test of the positive electrode with the porous film and the porous film adhesive strength test were carried out in the same manner as Example 1. The results are shown in Table 2.

TABLE 2

| Electrode Plate | Porous Film Adhesive Strength (N/m$^2$) | Peeling Test Results (mg) |
|---|---|---|
| 2A | 18 | 1.8 |
| 2B | 18 | 0 |
| 2C | 18 | 0 |
| 2D | 18 | 0 |

As in Table 1, Table 2 also shows that by using PVDF which gives a viscosity of 600 to 2400 mPa·s at 25° C. to an NMP solution dissolving 8 wt % PVDF, a positive electrode with a porous film with excellent binding ability and adhesiveness can be obtained.

Example 3

On the negative electrode reels obtained in Example 1, porous films were formed by the method below.

For the porous film material, an alumina powder with an average particle size of 0.5 μm, and a solution of PVDF in NMP (#7208 manufactured by Kureha Corporation) as the resin binder were used. The PVDF used here was the same as the one used for 1D in Example 1. By using a double-armed kneader, the alumina powder in an amount of 950 g was mixed with an appropriate amount of the solution of PVDF in NMP (a concentration of 12 wt %), setting the amount of the PVDF to 0.5, 1.0, 1.5, 5, 10, and 15 parts by weight per 100 parts by weight of the alumina powder, thereby making pastes 3A, 3B, 3C, 3D, 3E, and 3F for the porous film, respectively.

Then, on both sides of the above negative electrode reels, the pastes 3A, 3B, 3C, 3D, 3E, and 3F for the porous film were applied to give a thickness of 5 μm and dried, thereby obtaining negative electrode reels 3A, 3B, 3C, 3D, 3E, and 3F having six types of porous films.

The same peeling test as in Example 1 was carried out for the obtained negative electrodes with the respective porous films. The results are shown in Table 3.

TABLE 3

| Electrode Plate | Amount of PVDF Added* (parts by weight) | Results of Peeling Test (mg) |
|---|---|---|
| 3A | 0.5 | 3 |
| 3B | 1.0 | 0 |
| 3C | 1.5 | 0 |
| 3D | 5.0 | 0 |
| 3E | 10.0 | 0 |
| 3F | 15.0 | 5 |

*shown by amount per 100 parts by weight of alumina

Table 3 shows that peeling was curbed when the proportion of the amount of the PVDF added was 1 part by weight or more per 100 parts by weight of the alumina powder. However, peeling occurred when the proportion of the amount of the PVDF added exceeded 10 parts by weight per 100 parts by weight of the alumina powder. This is probably because the PVDF usage in a large amount made the bond between the inorganic compound particles excessively strong to significantly reduce mobility (powder flowability) of the alumina powder in the porous film, and caused a failure in enduring the stress at the time of the electrode winding. The result shows that the proportion of the amount of the PVDF added in the porous film is preferably 1 to 10 parts by weight per 100 parts by weight of the inorganic compound particles.

Example 4

A heat-treatment was carried out under a nitrogen atmosphere at 120° C. for 6 hours for the negative electrode reels obtained in Example 1 before forming the porous films, and then the porous films were formed in the same manner as Example 1. The obtained negative electrode reels 4A, 4B, 4C, and 4D were cut to give a size, i.e., a width of 62 mm and a length of 570 mm, and leads were attached thereto, thereby obtaining negative electrode plates.

Further, the positive electrode reels obtained in Example 2 were cut to give a size, i.e., a width of 60 mm and a length of 500 mm, and leads were attached thereto, thereby obtaining positive electrode plates.

For the separator, a polyethylene microporous film with a thickness of 16 μm was used.

The positive electrode plates and the negative electrode plates 4A, 4B, 4C, and 4D were wound with the separators to make electrode assemblies. These electrode assemblies were inserted into cylindrical battery cases with a diameter of 18 mm and a height of 670 mm. For the electrolyte, in a solvent in which ethylene carbonate and ethyl methyl carbonate were mixed in a volume ratio of 1:3, 1.0 mol/L of $LiPF_6$ was dissolved and used. After injecting 5.5 g of this electrolyte, the opening of the battery case was sealed with a sealing plate having a positive electrode terminal and a gasket, thereby making cylindrical batteries. The obtained batteries were named as batteries 4A, 4B, 4C, and 4D.

Batteries of Comparative Example were made as shown in below.

A paste for a negative electrode material mixture was made by mixing 2 kg of artificial graphite, 1 kg of a solution of PVDF in NMP (#1320 manufactured by Kureha Corporation), and an appropriate amount of NMP with a double-armed kneader. This paste was applied on both sides of copper foil with a thickness of 10 μm, dried, and rolled to give a total thickness of 180 μm. Negative electrode reels were thus obtained. The obtained negative electrode reels were dried in air at 110° C. for 6 hours. Then, on both sides of the negative electrode reels, the pastes 1A, 1B, 1C, and 1D for the porous film obtained in Example 1 were applied to give a thickness of 5 μm and dried, thereby making negative electrode reels 5A, 5B, 5C, and 5D with the porous films.

Cylindrical batteries were made in the same manner as Example 4, except that the negative electrode reels with the porous films obtained in the above were used. The obtained batteries were named batteries 5A, 5B, 5C, and 5D of Comparative Example.

Battery performance of the respective batteries was evaluated by the method shown in below. The results are shown in Table 4.

(iv) Discharge Performance Evaluation

The batteries were charged for 2 hours at a constant voltage of 4.2V, at an ambient temperature of 20° C. and a maximum charging current of 1400 mA, and then discharged with a constant discharging current of 200 mA to an end-of-discharge voltage of 3.0 V, to determine a discharge capacity. The determined capacity was regarded as a (battery rated capacity.

Then, the discharged batteries were re-charged with the conditions noted above, and then discharged with a constant current of 4000 mA to an end-of-discharge voltage of 3.0 V at an ambient temperature of 20° C. The capacity at large current discharge was thus determined.

The ratio of the capacity at large current discharge relative to the battery rated capacity was obtained. This was regarded as the discharge capacity retention rate.

TABLE 4

| Battery | Negative Electrode Binder | Discharge Capacity Retention Rate (%) |
|---|---|---|
| 4A | SBR | 90 |
| 4B | SBR | 90 |
| 4C | SBR | 90 |
| 4D | SBR | 90 |
| 5A | PVDF | 80 |
| 5B | PVDF | 80 |
| 5C | PVDF | 80 |
| 5D | PVDF | 80 |

Table 4 shows that the discharge capacity retention rate improved by 10% in the batteries 4A, 4B, 4C, and 4D of the present invention, in which the negative electrode with the porous film using SBR as the negative electrode binder was used, compared with the batteries 5A, 5B, 5C, and 5D of Comparative Example, in which the negative electrode with the porous film using PVDF as the negative electrode binder was used. The reasons may be as follows. When PVDF is included in the negative electrode material mixture layer, i.e., the base of the porous film, the negative electrode swelled by contacting the electrolyte, i.e., a homogenous polar solvent, to decline ion conductivity and deteriorate discharge performance. It is clear that for the binder to be included in the negative electrode material mixture layer, preferably selected is an SBR-type material, which is not soluble to polar solvents, does not easily swell, and is able to bring out binding effects with a small amount.

Example 5

Drying or heat-treatment was carried out for the negative electrode reels obtained in Example 1 before forming the porous film in the atmosphere at 110° C. for 6 hours, and then porous films were made in the same manner as Example 1. This was named as a negative electrode reel 6A. On the other hand, instead of the above heat-treatment, after a heat-treatment was carried out under nitrogen atmosphere at 120° C., 140° C., 180, 200° C., and 250° C. for 6 hours, porous films were formed. These negative electrode reels were named as 6B, 6C, 6D, 6E, and 6F. These negative electrode reels 6A to 6F were cut to give a size, i.e., a width of 62 mm and a length of 570 mm, and leads were attached, thereby obtaining respective negative electrode plates.

Cylindrical batteries were made in the same manner as Example 4, except that the above negative electrode plates were used. The obtained batteries were named as batteries 6A, 6B, 6C, 6D, 6E, and 6F.

A heat-treatment was carried out for the negative electrodes of those batteries 6A to 6F before forming the porous films. For comparison, those batteries using the negative electrode to which a heat-treatment was carried out after the porous film formation with the same conditions were named as batteries 7A to 7F.

Each of the above batteries was evaluated in the same manner as Example 4. The results are shown in Table 5.

TABLE 5

| Battery | Negative Electrode Reel Drying | Heat-treatment Conditions Heating | Atmosphere | Temperature (° C.) | Discharge Capacity Retention Rate (%) |
|---|---|---|---|---|---|
| 6A | 110° C. in Air | Before Porous Film Formation | — | — | 90 |
| 6B | No Drying | Before Porous Film Formation | Nitrogen | 120 | 90 |
| 6C | No Drying | Before Porous Film Formation | Nitrogen | 140 | 94 |
| 6D | No Drying | Before Porous Film Formation | Nitrogen | 180 | 94 |
| 6E | No Drying | Before Porous Film Formation | Nitrogen | 200 | 95 |
| 6F | No Drying | Before Porous Film Formation | Nitrogen | 250 | 95 |
| 7A | 110° C. in Air | After Porous Film Formation | — | — | 80 |
| 7B | No Drying | After Porous Film Formation | Nitrogen | 120 | 75 |
| 7C | No Drying | After Porous Film Formation | Nitrogen | 140 | 70 |
| 7D | No Drying | After Porous Film Formation | Nitrogen | 180 | 65 |
| 7E | No Drying | After Porous Film Formation | Nitrogen | 200 | 60 |
| 7F | No Drying | After Porous Film Formation | Nitrogen | 250 | 50 |

Regarding the examination on the conditions of drying or the heat-treatment of the negative electrode with the porous film, Table 5 shows that when SBR is used as the negative electrode binder, discharge performance further improved by 4 to 5% by carrying out the heat-treatment with a temperature of 140° C. or more in a nitrogen atmosphere before forming the porous film. This is probably because by burning off CMC having significant film-forming effects, excessive coverage of the negative electrode active material by CMC can be avoided to retain discharge performance. On the other hand, even though the same heat-treatment was carried out after forming the porous film, discharge performance did not improve but significantly declined. This is probably because pores for ions to pass through decreased due to the melting of the PVDF in the porous film, not preventing burning off of CMC by the porous film. Therefore, it is clear that the drying and heat-treatment of the negative electrode using CMC is preferably carried out before forming the porous film.

Industrial Applicability

A lithium ion secondary battery of the present invention is useful for a power source for various portable devices, since it achieves excellent safety while retaining discharge performance.

The invention claimed is:

1. A lithium ion secondary battery comprising:
    a positive electrode including a lithium composite oxide;
    a negative electrode including a material capable of electrochemically absorbing and desorbing lithium;
    a separator for separating said positive electrode and said negative electrode;
    a non-aqueous electrolyte; and
    a porous film formed on at least one electrode surface of said positive electrode and said negative electrode;
    said positive electrode, said negative electrode, and said separator being wound to form an electrode assembly:
    (a) said porous film including inorganic compound particles and a resin binder;
    (b) said resin binder in said porous film being polyvinylidene fluoride;
    (c) a viscosity of an 8 wt % solution of said polyvinylidene fluoride dissolved in Nmethyl-2-pyrrolidone is 600 to 2400 mPa·s at 25° C.; and
    (d) an amount of said polyvinylidene fluoride in said porous film being 1 to 10 parts by weight per 100 parts by weight of said inorganic compound particles.

2. The lithium ion secondary battery in accordance with claim 1, wherein said porous film is formed on a negative electrode surface, and said negative electrode includes a styrene-butadiene copolymer or a modified material thereof as a binder.

3. A method for producing a lithium ion secondary battery, said lithium ion secondary battery comprising a positive electrode, a negative electrode, and a separator for separating said positive electrode and said negative electrode being wound to form an electrode assembly;
    said positive electrode comprising a porous film including inorganic compound particles and polyvinylidene fluoride on a surface thereof;
    a viscosity of an 8 wt % solution of said polyvinylidene fluoride dissolved in N-methyl -2-pyrrolidone is 600 to 2400 mPa·s at 25° C.; and
    an amount of said polyvinylidene fluoride in said porous film being 1 to 10 parts by weight per 100 parts by weight of said inorganic compound particles;
    said method comprising the steps of:
    (a) preparing a paste including at least a negative electrode active material, a binder, a solvent or a dispersion medium for said binder, and carboxymethyl cellulose as a thickener;
    (b) applying said paste on a metal foil current collector, drying, rolling, and then heat-treating at a temperature of 140 to 250° C.; and
    (c) forming a porous film including inorganic compound particles and polyvinylidene fluoride on said negative electrode after the previous step.

4. The method for producing a lithium ion secondary battery in accordance with claim 3,
    wherein said step for forming a porous film comprises:
    preparing a paste for a porous film by mixing inorganic compound particles, polyvinylidene fluoride, and a polar solvent for dissolving said polyvinylidene fluoride; and applying said paste for a porous film on a negative electrode surface and drying to form said porous film.

5. The lithium ion secondary battery in accordance with claim 1, wherein an inorganic compound forming said inorganic compound particles is at least one selected from the group consisting of alumina, silica, zirconia, and titania.

6. The lithium ion secondary battery in accordance with claim 1, wherein said porous film is an uncoagulated film.

* * * * *